United States Patent

Bhatia

(10) Patent No.: US 12,386,906 B1
(45) Date of Patent: Aug. 12, 2025

(54) SYSTEM AND A METHOD FOR DETERMINING HIERARCHICAL RELATIONSHIP IN BATCHES OF DOCUMENTS

(71) Applicant: Brightleaf Solutions, Inc., Brookline, MA (US)

(72) Inventor: Samir Bhatia, Brookline, MA (US)

(73) Assignee: Brightleaf Solutions, Inc., Brookline, MA (US)

( * ) Notice: Subject to any disclaimer, the term of this patent is extended or adjusted under 35 U.S.C. 154(b) by 0 days.

(21) Appl. No.: 19/185,310

(22) Filed: Apr. 22, 2025

(51) Int. Cl.
- G06F 16/93 (2019.01)
- G06F 16/906 (2019.01)
- G06F 40/205 (2020.01)
- G06V 30/41 (2022.01)

(52) U.S. Cl.
CPC ............ *G06F 16/93* (2019.01); *G06F 16/906* (2019.01); *G06F 40/205* (2020.01); *G06V 30/41* (2022.01)

(58) Field of Classification Search
CPC ...... G06F 16/93; G06F 16/906; G06F 40/205; G06V 30/41
USPC .......................................................... 707/737
See application file for complete search history.

(56) References Cited

U.S. PATENT DOCUMENTS

| | | | |
|---|---|---|---|
| 7,853,621 B2 * | 12/2010 | Guo | G06F 16/58 707/999.1 |
| 7,885,918 B2 * | 2/2011 | Statchuk | G06F 16/367 707/777 |
| 11,803,577 B1 | 10/2023 | Onstott et al. | |
| 11,922,328 B1 | 3/2024 | Gdak et al. | |
| 2008/0294651 A1 | 11/2008 | Masuyama et al. | |

(Continued)

FOREIGN PATENT DOCUMENTS

WO 2002069186 A1 9/2002

OTHER PUBLICATIONS

Li, Miao, et al., "Summarizing Multiple Documents with Conversational Structure for Meta-Review Generation", arXiv, Cornell University archive document No. arXiv:2305.01498v3, Oct. 10, 2023, pp. 1-23.*

(Continued)

*Primary Examiner* — Robert Stevens
(74) *Attorney, Agent, or Firm* — Jason C. Cameron (57) ABSTRACT

A system for determining hierarchical relationship in batches of documents is disclosed. A data collection module receives one or more batches structured and unstructured documents. A metadata configuration module defines the plurality of metadata fields, enabling structured metadata extraction. The metadata extraction module identifies and extracts metadata attributes using an artificial intelligence model or extraction techniques. A first level verification module classifies documents as parent or child based on extracted attributes. A reviewer module allows specialists to manually validate classifications. A rule defining module enables user-defined match-up rules for parent-child and peer-to-peer relationships. A second level verification module refines classification using contextual analysis and generates structured data including the metadata attribute and the corresponding plurality of metadata fields, the parent-child relationship and the peer-to-peer. The structured data is reviewed, and confirmed, by the one or more specialist. A display module to provide reviewed structured data to the user.

12 Claims, 5 Drawing Sheets

(56) References Cited

U.S. PATENT DOCUMENTS

| | | | |
|---|---|---|---|
| 2014/0258316 A1* | 9/2014 | O'Hagan | G06F 16/215 |
| | | | 707/756 |
| 2021/0004526 A1* | 1/2021 | Kahn | G06F 16/84 |
| 2022/0309226 A1* | 9/2022 | D'Oria | G06F 40/103 |
| 2023/0120826 A1 | 4/2023 | Amiri Modghadam et al. | |
| 2024/0143642 A1 | 5/2024 | Apostolova | |
| 2025/0124086 A1* | 4/2025 | Blanchflower | G06F 16/35 |

OTHER PUBLICATIONS

Shreve, Gregory M., et al., "Integrating Resource Metadata and Domain Markup in an NSDL Collection", Proc. of the International Conference on Dublin Core and Metadata Applications (DC-2003), Seattle, WA, Sep. 28, 2003, 7 pages (pp. 223-229).*

* cited by examiner

SYSTEM AND A METHOD FOR DETERMINING HIERARCHICAL RELATIONSHIP IN BATCHES OF DOCUMENTS

FIELD OF INVENTION

Embodiments of the present disclosure relate to the field of document management, and more particularly, a system and a method for determining hierarchical relationship in batches of documents.

BACKGROUND

Document management plays an important role in organizing, storing, and retrieving vast amounts of information. The document management involves the systematic process of capturing, categorizing, and maintaining documents to ensure accessibility and compliance. However, as the volume of documents increases, managing documents becomes increasingly complex, especially when dealing with large sets of unstructured data. Identifying document relationships, classifying records, and retrieving relevant information efficiently becomes a significant challenge.

Traditional document management relies heavily on manual processes, leading to time-consuming efforts, errors, and inconsistencies. Many industries require structured documentation where a single parent document can have multiple associated child documents. Manually verifying these relationships is time-consuming and error prone.

For instance, legal and contract management, a Master Service Agreement (MSA) may have multiple amendments or addendums. When dealing with thousands of contracts, it becomes difficult to identify the parent MSA and its associated amendments. In another example, in healthcare and patient records, a patient master record serves as the central document containing all essential information. And related documents such as investigative reports, medical prescriptions, bills, invoices and the like, act as child documents. For financial institutions, client account records may be the master, and all the associated documents will be child e.g. loan contracts, mutual funds, credit cards, insurance and the like.

Hence, there is a need for an improved system and method for determining hierarchical relationship in batches of documents which addresses the aforementioned issue(s).

OBJECTIVES OF THE INVENTION

Primary objective of the invention is to automate the validation of parent-child document relationships using pre-defined rules and metadata attributes, thereby minimizing manual effort.

Another objective of the invention is to enhance accuracy in document hierarchy determination by ensuring that additional metadata attributes from the child record (such as the parent effective date and parent agreement type) align with the corresponding metadata attributes of the parent.

BRIEF DESCRIPTION

In accordance with an embodiment of the present disclosure, a system for determining hierarchical relationship in batches of documents is provided. The system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes a data collection module configured to receive one or more batches of documents from a user. Each document of the one or more batches of documents is one of an unstructured document or a structured document. The processing subsystem includes a metadata configuration module operatively coupled to the data collection module. The metadata configuration module is configured to define a plurality of metadata fields to enable a structured metadata extraction from the one or more batches of documents. The plurality of metadata fields is user-configurable and defined based on user input. The processing subsystem includes a metadata extraction module operatively coupled to the metadata configuration module. The metadata extraction module is configured to parse the one or more batches of documents to identify a plurality of metadata attributes corresponding to the plurality of metadata fields. The metadata extraction module is configured to extract the identified plurality of metadata attributes using at least one of an artificial intelligence model and one or more extraction techniques. The processing subsystem includes a first level verification module operatively coupled to the metadata extraction module. The first level verification module is configured to classify each document as a parent document or a child document based on the plurality of metadata attributes extracted. The processing subsystem includes a reviewer module operatively coupled to the first level verification module. The reviewer module is configured to enable one or more specialists to review and confirm the classification of each document as the parent document and the child document manually. The processing subsystem includes a rule defining module operatively coupled to the reviewer module. The rule defining module is configured to allow the user to define one or more user-defined match up rules to determine a parent-child relationship and a peer-to-peer relationship across the one or more batches of documents. The processing subsystem includes a second level verification module operatively coupled to the rule defining module. The second level verification module is configured to automatically determine the hierarchical relationship including the parent-child relationship and the peer-to-peer relationship across the one or more batches of documents by analyzing the plurality of metadata attributes, contextual information and document classification using the one or more user-defined match up rules and the artificial intelligence model. The second level verification module is configured to generate a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module. The processing subsystem includes a display module operatively coupled to the second level verification module. The display module is configured to provide the reviewed structured data to the user via a user interface.

In accordance with an embodiment of the present disclosure, a method for determining hierarchical relationship in batches of documents is provided. The method includes receiving, by a data collection module, one or more batches of documents from a user. Each document of the one or more batches of documents is one of an unstructured document or a structured document. The method includes defining, by a metadata configuration module, a plurality of metadata fields to enable a structured metadata extraction from the one or more batches of documents. The plurality of metadata fields is user-configurable and defined based on user input. The method includes parsing, by a metadata extraction module, the one or more batches of documents to identify a plurality of metadata attributes corresponding to the plurality of metadata fields. The method includes extracting, by the metadata extraction module, the identified plurality of metadata attributes using at least one of an artificial intelligence model and one or more extraction techniques. The method includes classifying, by a first level verification module, each document as a parent document or a child document based on the plurality of metadata attributes extracted. The method includes enabling, by a reviewer module, one or more specialists to review, and confirm the classification of each document as the parent document and the child document manually. The method includes allowing, by a rule defining module, the user to define one or more user-defined match up rules to determine a parent-child relationship and a peer-to-peer relationship across the one or more batches of documents. The method includes automatically determining, by the second level verification module, the hierarchical relationship including the parent-child relationship and the peer-to-peer relationship across the one or more batches of documents by analyzing the plurality of metadata attributes, contextual information and document classification using the one or more user-defined match up rules and the artificial intelligence model. The method includes generating, by a second level verification module, a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module. The method includes providing, by a display module, the reviewed structured data to the user via a user interface.

In accordance with another embodiment of the present disclosure, a non-transitory computer-readable medium storing a computer program that, when executed by a processor, causes the processor to perform a method for determining hierarchical relationship in batches of documents is provided. The method includes receiving, by a data collection module, one or more batches of documents from a user. Each document of the one or more batches of documents is one of an unstructured document or a structured document. The method includes defining, by a metadata configuration module, a plurality of metadata fields to enable a structured metadata extraction from the one or more batches of documents. The plurality of metadata fields is user-configurable and defined based on user input. The method includes parsing, by a metadata extraction module, the one or more batches of documents to identify a plurality of metadata attributes corresponding to the plurality of metadata fields. The method includes extracting, by the metadata extraction module, the identified plurality of metadata attributes using at least one of an artificial intelligence model and one or more extraction techniques. The method includes classifying, by a first level verification module, each document as a parent document or a child document based on the plurality of metadata attributes extracted. The method includes enabling, by a reviewer module, one or more specialists to review, and confirm the classification of each document as the parent document and the child document manually. The method includes allowing, by a rule defining module, the user to define one or more user-defined match up rules to determine a parent-child relationship and a peer-to-peer relationship across the one or more batches of documents. The method includes automatically determining, by the second level verification module, the hierarchical relationship including the parent-child relationship and the peer-to-peer relationship across the one or more batches of documents by analyzing the plurality of metadata attributes, contextual information and document classification using the one or more user-defined match up rules and the artificial intelligence model. The method includes generating, by a second level verification module, a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module. The method includes providing, by a display module, the reviewed structured data to the user via a user interface.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated computer-implemented system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In accordance with an embodiment of the present disclosure, a system for determining hierarchical relationship in batches of documents is provided. The system includes a hardware processor, and a memory coupled to the hardware processor. The memory comprises a set of program instructions in the form of a processing subsystem hosted on a server and configured to execute on a network to control bidirectional communications among a plurality of modules. The processing subsystem includes a data collection module configured to receive one or more batches of documents from a user. Each document of the one or more batches of documents is one of an unstructured document or a structured document. The processing subsystem includes a metadata configuration module operatively coupled to the data collection module. The metadata configuration module is configured to define a plurality of metadata fields to enable a structured metadata extraction from the one or more batches of documents. The plurality of metadata fields is user-configurable and defined based on user input. The processing subsystem includes a metadata extraction module operatively coupled to the metadata configuration module. The metadata extraction module is configured to parse the one or more batches of documents to identify a plurality of metadata attributes corresponding to the plurality of metadata fields. The metadata extraction module is configured to extract the identified plurality of metadata attributes using at least one of an artificial intelligence model and one or more extraction techniques. The processing subsystem includes a first level verification module operatively coupled to the metadata extraction module. The first level verification module is configured to classify each document as a parent document or a child document based on the plurality of metadata attributes extracted. The processing subsystem includes a reviewer module operatively coupled to the first level verification module. The reviewer module is configured to enable one or more specialists to review and confirm the classification of each document as the parent document and the child document manually. The processing subsystem includes a rule defining module operatively coupled to the reviewer module. The rule defining module is configured to allow the user to define one or more user-defined match up rules to determine a parent-child relationship and a peer-to-peer relationship across the one or more batches of documents. The processing subsystem includes a second level verification module operatively coupled to the rule defining module. The second level verification module is configured to automatically determine the hierarchical relationship including the parent-child relationship and the peer-to-peer relationship across the one or more batches of documents by analyzing the plurality of metadata attributes, contextual information and document classification using the one or more user-defined match up rules and the artificial intelligence model. The second level verification module is configured to generate a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module. The processing subsystem includes a display module operatively coupled to the second level verification module. The display module is configured to provide the reviewed structured data to the user via a user interface.

Figure 1:
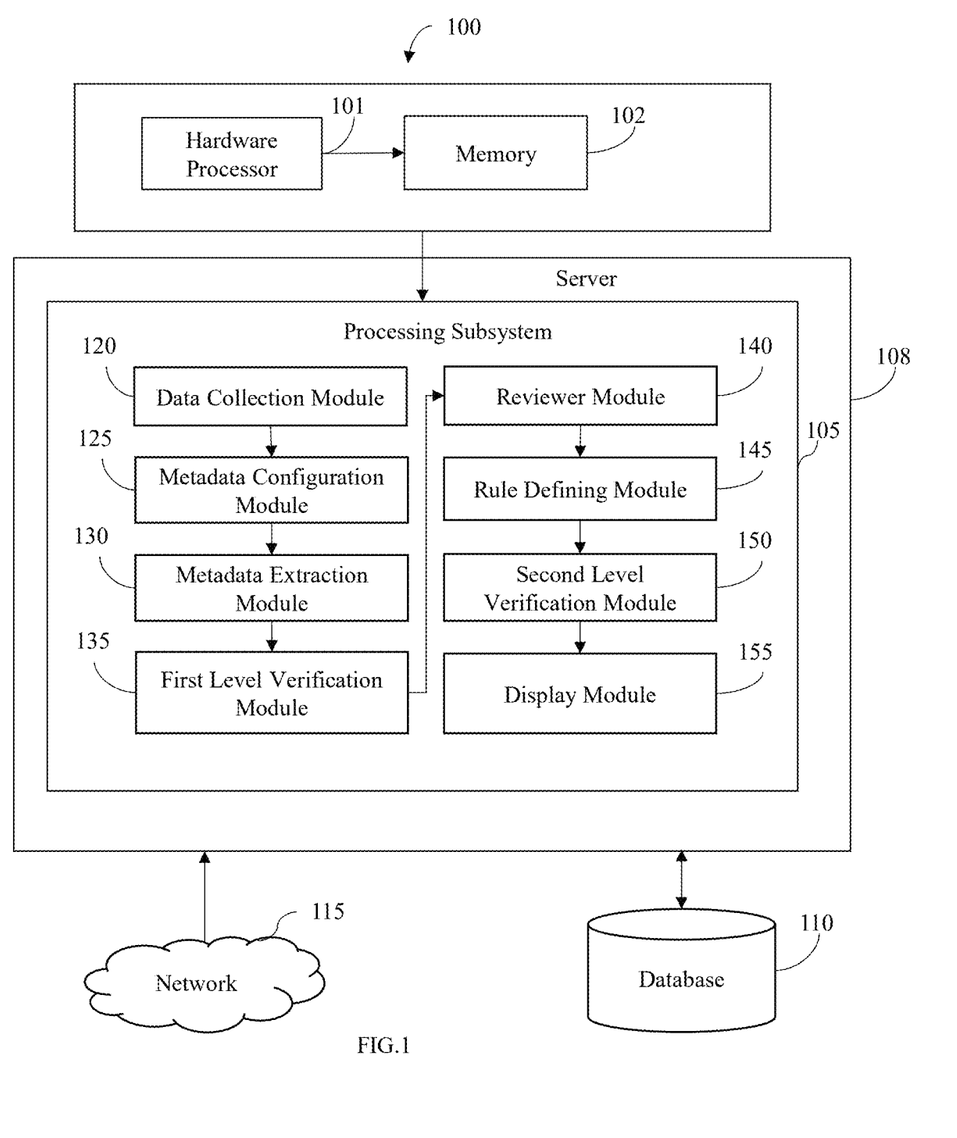
FIG. 1 is a block diagram representation of a system for determining hierarchical relationship in batches of documents in accordance with an embodiment of the present disclosure.

FIG. 1 is a block diagram representation of a system 100 for determining hierarchical relationship in batches of documents in accordance with an embodiment of the present disclosure. Generally, in document management, documents are kept in a structured way, where some act as parent documents and others as child documents. The determination of the hierarchical relationship in batches of documents refers to identifying parent-child relationships among multiple documents. The parent document is a main document, while the child document is a related or dependent document that derives information from the parent document.

The system 100 includes a hardware processor 101 and a memory 102 coupled to the hardware processor 101. The memory 102 includes a set of program instructions in the form of a processing subsystem 105 and is configured to be executed by the hardware processor 101. As used herein, the hardware processor 101 performs data processing, decision making, and all general computing tasks and coordinates tasks done by memory, disk storage, and other system components. The processing subsystem 105 hosted on a server 108. In one embodiment, the server 108 may include a cloud server. In another embodiment, the server 108 may include a local server. The processing subsystem 105 is configured to execute on a network 115 to control bidirectional communications among a plurality of modules. In one embodiment, the network 115 may include a wired network such as a local area network (LAN) or Wide Area Network (WAN), such as the Internet. In another embodiment, the network 115 may include both wired and wireless communications according to one or more standards and/or via one or more transport mediums. In one example, the network 115 may include wireless communications according to one of the 802.11 or Bluetooth specification sets, or another standard or proprietary wireless communication protocol. In yet another embodiment, the network 115 may also include communications over a terrestrial cellular network, including, a global system for mobile communications (GSM), code division multiple access (CDMA), and/or enhanced data for global evolution (EDGE) network.

The processing subsystem 105 includes a data collection module 120 configured to receive one or more batches of documents from a user. Each document of the one or more batches of documents is one of an unstructured document or a structured document. The structured documents refer to files that follow a predefined format, making them searchable and easily analyzable. Examples include word processing documents, spreadsheets, database records, and the like. On the other hand, the unstructured document lacks a fixed format and may include scanned copies, handwritten notes, free-text files, and the like.

The processing subsystem 105 includes a metadata configuration module 125 operatively coupled to the data collection module 120. The metadata configuration module 125 is configured to define a plurality of metadata fields to enable a structured metadata extraction from the one or more batches of documents. Examples for the plurality of metadata fields include, but are not limited to, at least one of entity name, document title, document type, effective date, parent effective date, parent agreement type, and the like.

The plurality of metadata fields is user-configurable and defined based on user input. Different industries may require different metadata fields. For example, in the legal industry, Master Service Agreements (MSA), amendments, effective dates, and the like, are crucial for tracking contract modifications. In healthcare, patient records, medical prescriptions, test reports, and the like need structured classification. Users may manually define the plurality of metadata fields for classification and extraction based on the documents.

The processing subsystem 105 includes a metadata extraction module 130 operatively coupled to the metadata configuration module 125. The metadata extraction module 130 is configured to parse the one or more batches of documents to identify a plurality of metadata attributes corresponding to the plurality of metadata fields.

The metadata extraction module 130 is configured to extract the identified plurality of metadata attributes using at least one of an artificial intelligence model and one or more extraction techniques.

In one embodiment, the artificial intelligence model and the one or more extraction techniques collectively utilize natural language processing (NLP), machine learning (ML), and rule-based algorithms to extract and classify the plurality of metadata. These techniques are fine-tuned with extensive domain-specific datasets, particularly in legal, financial, healthcare domains, and the like, where documents often contain complex relationships and varying terminologies.

The rule-based extraction technique employs keyword searches and regular expressions (RegEx) to detect predefined patterns in the documents. The rule-based extraction technique is useful for extracting the plurality of metadata attributes corresponding to the plurality of metadata fields. Meanwhile the machine learning (ML) models are trained on large industry-specific datasets, allowing them to continuously improve in recognizing patterns and relationships among metadata attributes. That rule-based extraction using RegEx and keyword search is optimized for structured and semi-structured documents, whereas machine learning models handle unstructured documents with greater contextual understanding.

In another embodiment, a generative pre-trained artificial intelligence with autosuggestions enhances extraction of the plurality of metadata attributes corresponding to the plurality of metadata fields by leveraging advanced natural language processing techniques.

In another embodiment, the metadata extraction module 130 uses advanced Named Entity Recognition (NER) for accurately identifying key entities within the one or more batches of documents. NER may be used for analyzing unstructured documents such as emails, reports, and the like.

The processing subsystem 105 includes a first level verification module 135 operatively coupled to the metadata extraction module 130. The first level verification module 135 is configured to classify each document as a parent document or a child document based on the plurality of metadata attributes extracted. The artificial intelligence model detects subtle variations in language and context, enabling the first level verification module 135 to accurately determine the parent document and the child document.

It must be noted that the artificial intelligence model is configured with an artificial intelligence algorithm. Examples of the artificial intelligence algorithm include, but are not limited to, a Deep Neural Network (DNN), Convolutional Neural Network (CNN), Restricted Boltzmann Machine (RBM), Deep Belief Network (DBN) and Deep Q-Networks.

It must be noted that, in the first level verification module 135, the system focuses only on common metadata attributes when classifying the parent document and the child document. The common metadata attributes are the plurality of metadata fields that apply uniformly to both parent documents and child documents.

For example, in the legal industry, documents such as Master Service Agreements (MSAs), amendments, and addendums are processed by the data collection module 120. Among the extracted plurality of metadata fields, the common metadata attributes include entity name, document title, document type, effective date, and the like. The common metadata attributes are used to classify the parent document and the child document from documents. The parent effective date and parent agreement type, which are specific to the child documents, are used specifically to identify parent-child relationships.

The processing subsystem 105 includes a reviewer module 140 operatively coupled to the first level verification module 135. The reviewer module 140 is configured to enable one or more specialists to review and confirm the classification of each document as the parent document and the child document manually. The reviewer module 140 displays the classification results in a standardized format to the one or more specialist, highlighting the plurality of metadata fields and their corresponding attributes. The key details such as document type are clearly displayed, enabling the one more specialist to quickly and accurately determine whether the document is classified as a parent or child. Since the specialists have expertise in the respective domain of the documents, they may validate and refine the classification as needed. This manual review process helps reduce potential errors from relying solely on artificial intelligence and enhances overall classification accuracy.

It must be noted that any manual corrections made by the one or more specialists are fed back into the artificial intelligence model. The artificial intelligence model is retrained using data from the reviewer module 140, allowing the artificial intelligence model to contribute to continuous learning and model enhancement over time.

The processing subsystem 105 includes a rule defining module 145 operatively coupled to the reviewer module 140. The rule defining module 145 is configured to allow the user to define one or more user-defined match up rules to determine a parent-child relationship and a peer-to-peer relationship across the one or more batches of documents. The parent-child relationship determines which child document is associated with a specific parent document, while the peer-to-peer relationship identifies connections between documents at the same hierarchical level, such as links between child documents. The one or more user-defined match up rules defining criteria for determining these relationships based on the plurality of metadata attributes extracted from documents.

The processing subsystem 105 includes a second level verification module 150 operatively coupled to the rule defining module 145. The second level verification module 150 is configured to automatically determine the hierarchical relationship including the parent-child relationship and the peer-to-peer relationship across the one or more batches of documents by analyzing the plurality of metadata attributes, contextual information and document classification using the one or more user-defined match up rules and the artificial intelligence model. By leveraging metadata analysis, the second level verification module 150 evaluates the plurality of metadata attributes. Additionally, contextual information is processed using natural language processing techniques to detect relationships between documents. The artificial intelligence model further refines document classification, where the child documents are linked to their respective parent documents, and peer-to-peer relationships, where related documents at the same level are associated with one another.

It must be noted that, in the plurality of metadata field, the common metadata fields including the entity name, document title, document type, and effective date are used for classifying the parent document and the plurality of metadata field specific to the child document, such as the parent effective date and parent agreement type are used for determining the parent-child relationship and the peer-to-peer relationship. More specifically, the common attributes are used for classifying the parent document and the child document while the child specific attributes are used to determining the parent-child relationship and the peer-to-peer relationship.

The second level verification module 150 is configured to generate a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module 140. The one or more specialists manually inspect the determined parent-child relationship and the peer-to-peer relationship and correct any misclassifications.

It must be noted that the structured data may be exported in various formats, including but not limited to Excel sheets, CSV files, relational databases, XML, and the like.

It must be noted that the system 100 includes a database 110 configured to store the structured data with the parent-child relationship and the peer-to-peer relationship.

In an embodiment, the second level verification module 150 is configured to assign a unique identifier to the child document corresponding to the parent document, thereby confirming a match. Thereby the user can easily understand the parent-child relationship. The second level verification module 150 further flag the child document for further review by the one or more specialists if no match is identified. The second level verification module 150 is configured to enable the one or more specialists to review and execute modification for an incorrect parent-child relationship and an incorrect peer-to-peer relationship, thereby update the structured data.

The processing subsystem 105 includes a display module 155 operatively coupled to the second level verification module 150. The display module 155 is configured to provide the reviewed structured data to the user via a user interface. Examples of the types of user interface include but are not limited to graphical user interface, command line interface, menu-driven user interface, touch user interface, natural language user interface and the like.

The user interface is accessed and operated by the user through a user device. It is to be noted that the user device may comprise, but is not limited to, a mobile phone, desktop computer, portable digital assistant (PDA), smart phone, tablet, ultra-book, netbook, laptop, multi-processor system, microprocessor-based or programmable consumer electronic system, or any other communication device that a user may use. In further embodiments, the user device may comprise one or more of touch screens, accelerometers, gyroscopes, cameras, microphones, global positioning system (GPS) devices, and so forth.

Let's consider an example in the legal industry where a firm is using the system 100 for document management. For data organization and enhancement of future accessibility, the firm aims to categorize its documents into a structured hierarchical order. The firm utilizes the system 100 to determine hierarchical relationships in batches of documents. For that, the user uploads a batch of legal documents, including "Amendment 1 to Master Service Agreement," "ACME Master Service Agreement," "Amendment 2 to Master Service Agreement," "SOW Amend 2," "Bravado Amend 1," "SOW Amend 1," and "ACME SOW." Upon receiving these documents, the data collection module 120 processes them. The user then defines the plurality of metadata fields relevant to the legal domain through the metadata configuration module 125. In this case, the defined metadata fields include entity name, document title, document type, effective date, parent effective date, and parent agreement type. Next, the metadata extraction module 130 extracts the corresponding metadata attributes from the uploaded documents. By analyzing these attributes, the first-level verification module classifies each document as either a parent or a child document. Based on common metadata fields, the system 100 identifies "ACME Master Service Agreement" and "ACME SOW" as parent documents, while "Amendment 1 to Master Service Agreement," "Amendment 2 to Master Service Agreement," "SOW Amend 2," "Bravado Amend 1," and "SOW Amend 1" are classified as child documents. To ensure classification accuracy, one or more legal specialists review the classification results via the reviewer module 140 and confirm the parent and the child. Following this, the rule-defining module allows the user to set up user-defined match-up rules, which establish parent-child and peer-to-peer relationships based on document metadata. The second-level verification module then uses child-specific attributes, such as parent effective date and parent agreement type, to determine document relationships. The system 100 identifies that "Amendment 1 to Master Service Agreement" and "Amendment 2 to Master Service Agreement" are children of "ACME Master Service Agreement." Similarly, "SOW Amend 1" and "SOW Amend 2" are linked as child documents under "ACME SOW." However, the system 100 does not find a parent match for "Bravado Amend 1," so the second-level verification module flags it for further review. The reviewer module 140 then re-evaluates the flagged child document, allowing specialists to manually review and validate its classification. After the review, a final structured data is generated in an Excel format, and presented to the user. Now, the firm has a well-structured document hierarchy that can be easily accessible.

In one embodiment, the various functional components of the computer-implemented system may reside on a single computer, or they may be distributed across several computers in various arrangements. The various components of the computer-implemented system may, furthermore, access one or more databases, and each of the various components of the computer-implemented system may be in communication with one another. Further, while the components of FIG. 1 are discussed in the singular sense, it will be appreciated that in other embodiments multiple instances of the components may be employed.

Figure 2:
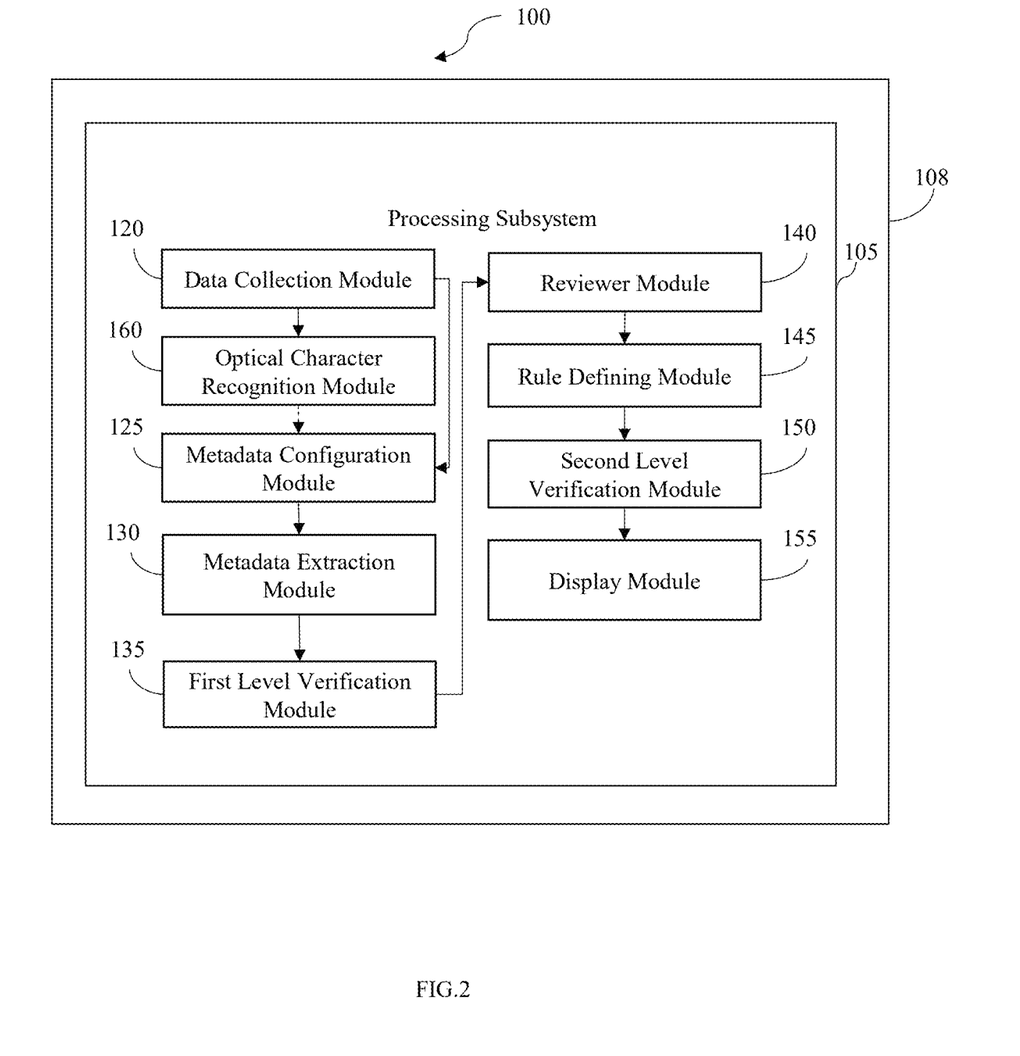
FIG. 2 is a schematic representation of an exemplary embodiment of the system for determining hierarchical relationship in batches of documents of FIG. 1 in accordance with an embodiment of the present disclosure.

FIG. 2 is a schematic representation of an exemplary embodiment of the system 100 for determining hierarchical relationship in batches of documents of FIG. 1 in accordance with an embodiment of the present disclosure. The system 100 of FIG. 1 includes the data collection module 120, the metadata configuration module 125, the metadata extraction module 130, the first level verification module 135, the reviewer module 140, the rule defining module 145, the second level verification module 150, and the display module 155. In one embodiment, the processing subsystem 105 includes an optical character recognition module 160 operatively coupled to the data collection module 120. The optical character recognition module 160 is configured to convert image-based the one or more batches of documents into one or more text-searchable formats using optical character recognition. The optical character recognition (OCR) is a technology that converts text from images into machine-readable text. OCR may be used to convert scanned documents, photos, or subtitle text into editable text.

Figure 3:
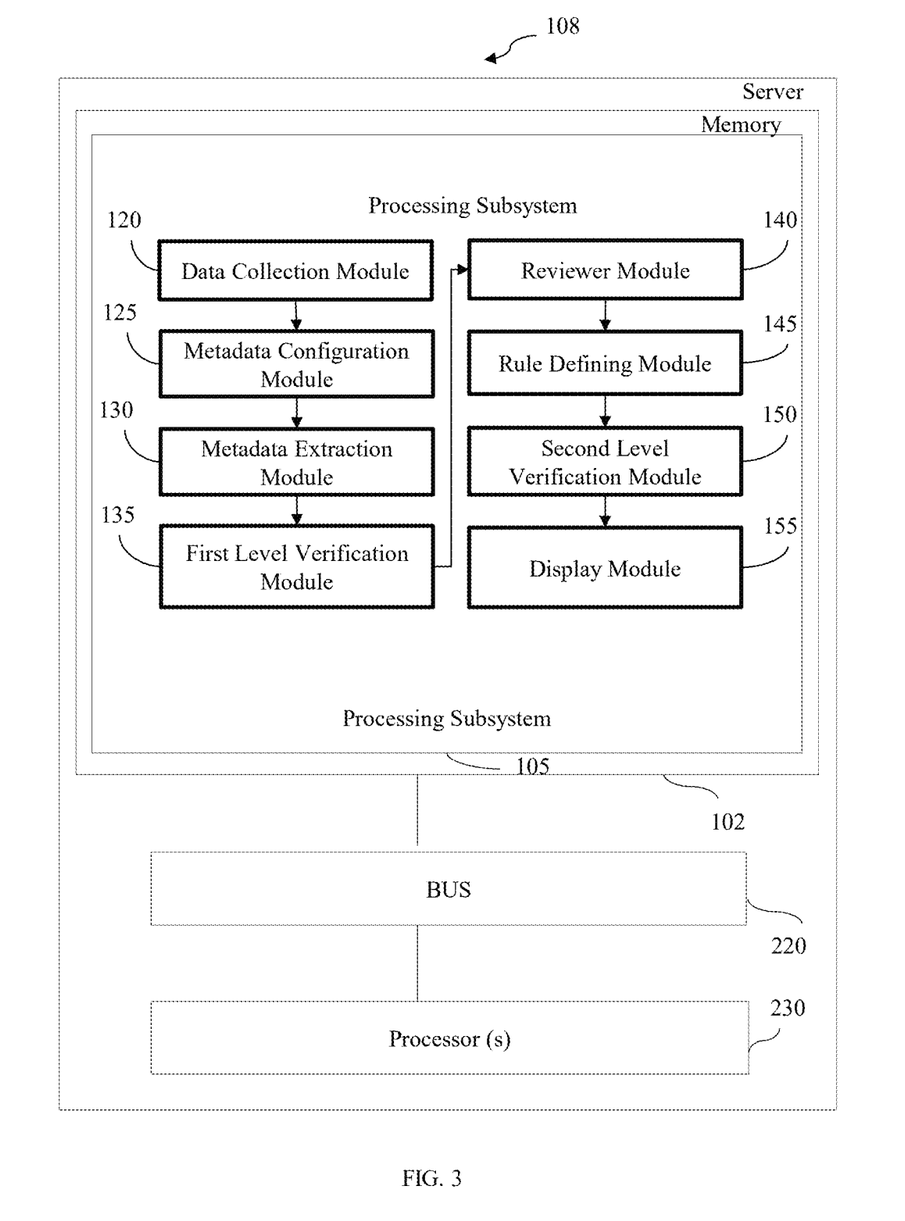
FIG. 3 is a block diagram of a computer or a server in accordance with an embodiment of the present disclosure.

FIG. 3 is a block diagram of a computer or a server 108 in accordance with an embodiment of the present disclosure. The server 108 includes processor(s) 230, and memory 102 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 102 includes several subsystems stored in the form of computer-readable medium which instructs the processor to perform the method steps illustrated in FIG. 1. The memory 102 includes several subsystems stored in the form of executable program which instructs the processor 230 to perform the method steps illustrated in FIG. 1. The memory 102 includes a processing subsystem 105 of FIG. 1. The processing subsystem 105 further has following modules: a data collection module 120, a metadata configuration module 125, a metadata extraction module 130, a first level verification module 135, a reviewer module 140, a rule defining module 145, a second level verification module 150, and a display module 155.

In accordance with an embodiment of the present disclosure, a system 100 for determining hierarchical relationship in batches of documents is provided. The system 100 includes a hardware processor 101 and a memory 102 coupled to the hardware processor. The memory 102 comprises a set of program instructions in the form of a processing subsystem 105 hosted on a server 108 and configured to execute on a network 115 to control bidirectional communications among a plurality of modules. The processing subsystem 105 includes a data collection module 120 configured to receive one or more batches of documents from a user. Each document of the one or more batches of documents is one of an unstructured document or a structured document. The processing subsystem 105 includes a metadata configuration module 125 operatively coupled to the data collection module 120. The metadata configuration module 125 is configured to define a plurality of metadata fields to enable a structured metadata extraction from the one or more batches of documents. The plurality of metadata fields is user-configurable and defined based on user input. The processing subsystem 105 includes a metadata extraction module 130 operatively coupled to the metadata configuration module 125. The metadata extraction module 130 is configured to parse the one or more batches of documents to identify a plurality of metadata attributes corresponding to the plurality of metadata fields. The metadata extraction module 130 is configured to extract the identified plurality of metadata attributes using at least one of an artificial intelligence model and one or more extraction techniques. The processing subsystem 105 includes a first level verification module 135 operatively coupled to the metadata extraction module 130. The first level verification module 135 is configured to classify each document as a parent document or a child document based on the plurality of metadata attributes extracted. The processing subsystem 105 includes a reviewer module 140 operatively coupled to the first level verification module 135. The reviewer module 140 is configured to enable one or more specialists to review and confirm the classification of each document as the parent document and the child document manually. The processing subsystem 105 includes a rule defining module 145 operatively coupled to the reviewer module 140. The rule defining module 145 is configured to allow the user to define one or more user-defined match up rules to determine a parent-child relationship and a peer-to-peer relationship across the one or more batches of documents. The processing subsystem 105 includes a second level verification module 150 operatively coupled to the rule defining module 145. The second level verification module 150 is configured to automatically determine the hierarchical relationship including the parent-child relationship and the peer-to-peer relationship across the one or more batches of documents by analyzing the plurality of metadata attributes, contextual information and document classification using the one or more user-defined match up rules and the artificial intelligence model. The second level verification module 150 is configured to generate a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module 140. The processing subsystem 105 includes a display module 155 operatively coupled to the second level verification module 150. The display module 155 is configured to provide the reviewed structured data to the user via a user interface.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein may include but not limited to, a system bus, an internal bus, an external bus, an expansion bus, a frontside bus, a backside bus, and the like.

Figure 4A:
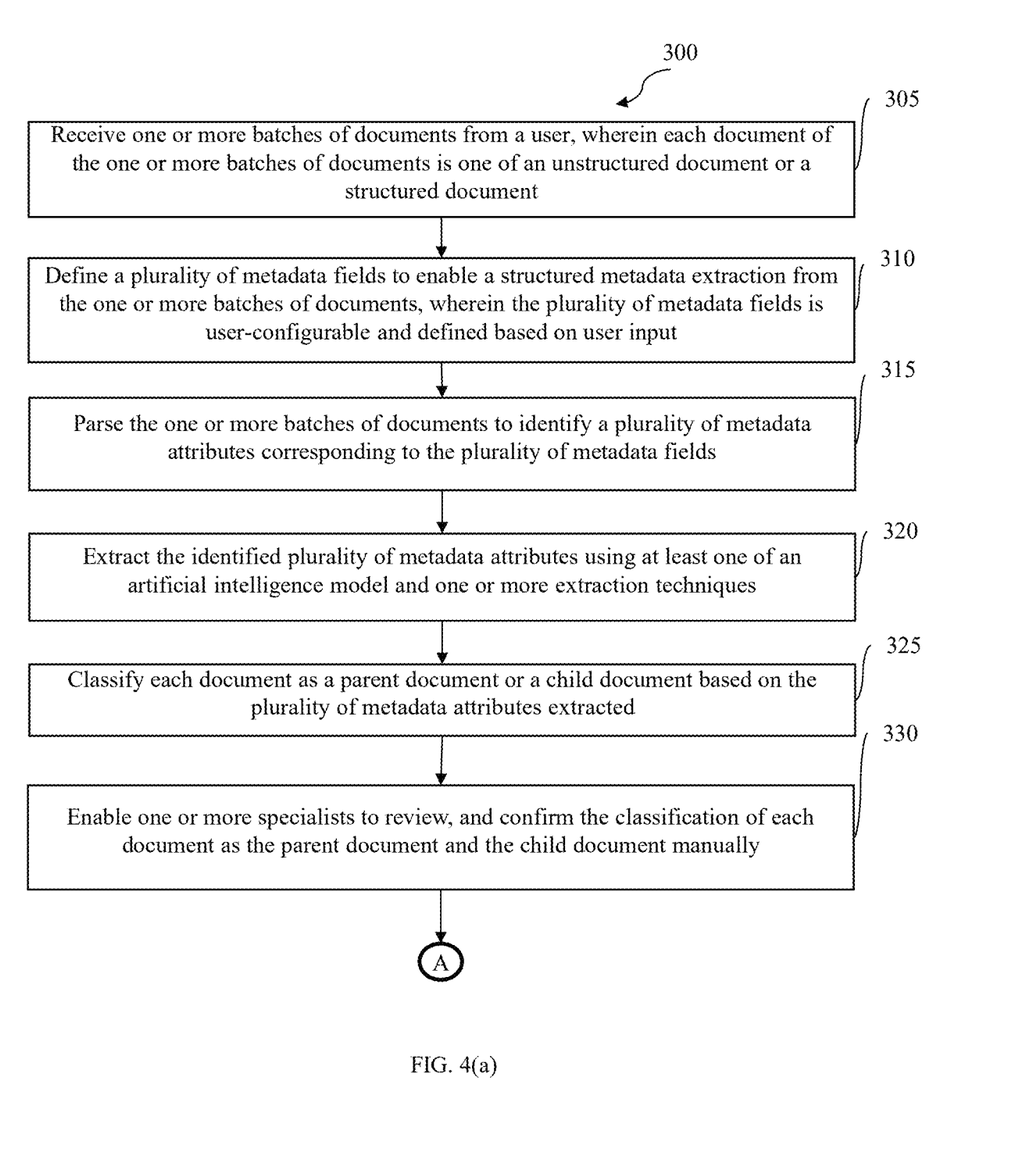
FIG. 4a and FIG. 4b illustrates a flow chart representing the steps involved in a method for determining hierarchical relationship in batches of documents in accordance with an embodiment of the present disclosure.
Figure 4B:
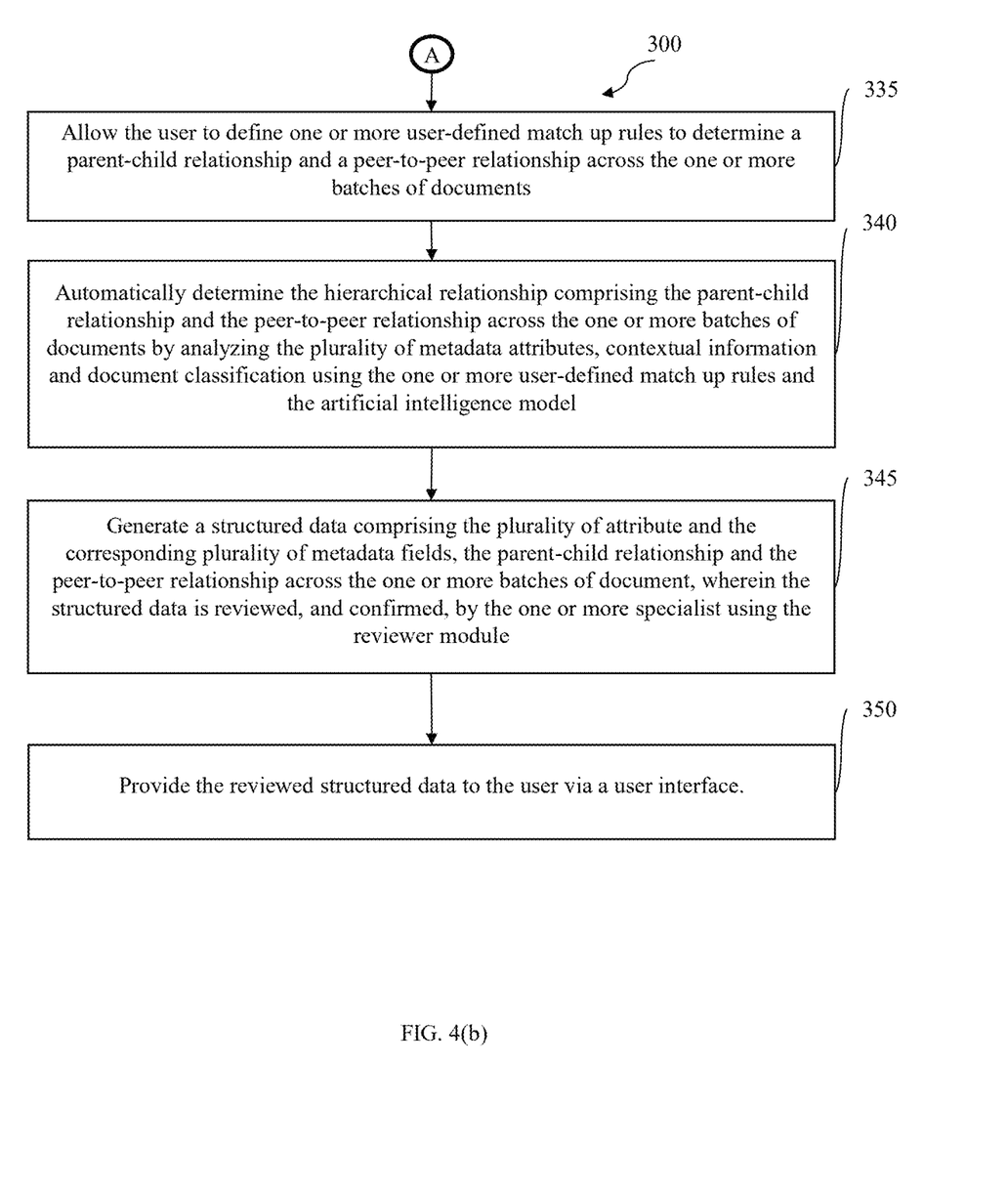

FIG. 4*a* and FIG. 4*b* illustrates a flow chart representing the steps involved in a method 300 for determining hierarchical relationship in batches of documents in accordance with an embodiment of the present disclosure. Generally, in document management, documents are kept in a structured way, where some act as parent documents and others as child documents. The determination of the hierarchical relationship in batches of documents refers to identifying parent-child relationships among multiple documents. The parent document is a main document, while the child document is a related or dependent document that derives information from the parent document.

The method 300 begins at step 305.

At 305, the method 300 includes receiving, by a data collection module, one or more batches of documents from a user. Each document of the one or more batches of documents is one of an unstructured document or a structured document. The structured documents refer to files that follow a predefined format, making them searchable and easily analyzable. Examples include word processing documents, spreadsheets, database records, and the like. On the other hand, the unstructured document lacks a fixed format and may include scanned copies, handwritten notes, free-text files, and the like.

At 310, the method 300 includes defining, by a metadata configuration module, a plurality of metadata fields to enable a structured metadata extraction from the one or more batches of documents. The plurality of metadata fields is user-configurable and defined based on user input. Examples for the plurality of metadata fields include but are not limited to at least one of entity name, document title, document type, effective date, parent effective date, parent agreement type, and the like.

It must be noted that, different industries may require different metadata fields. For example, in the legal industry, Master Service Agreements (MSA), amendments, effective dates, and the like, are crucial for tracking contract modifications. In healthcare, patient records, medical prescriptions, test reports, and the like need structured classification. Users may manually define the plurality of metadata fields for classification and extraction At 315, the method 300 includes parsing, by a metadata extraction module, the one or more batches of documents to identify a plurality of metadata attributes corresponding to the plurality of metadata fields.

A t 320, the method 300 includes extracting, by the metadata extraction module, the identified plurality of metadata attributes using at least one of an artificial intelligence model and one or more extraction techniques.

In one embodiment, the artificial intelligence model and the one or more extraction techniques collectively utilize natural language processing (NLP), machine learning (ML), and rule-based algorithms to extract and classify the plurality of metadata. These techniques are fine-tuned with extensive domain-specific datasets, particularly in legal, financial, healthcare domains, and the like, where documents often contain complex relationships and varying terminologies.

The rule-based extraction technique employs keyword searches and regular expressions (RegEx) to detect predefined patterns in the documents. The rule-based extraction technique is useful for extracting the plurality of metadata attributes corresponding to the plurality of metadata fields.

Meanwhile the machine earning (ML) models are trained on large industry-specific datasets, allowing them to continuously improve in recognizing patterns and relationships among metadata attributes. That rule-based extraction using RegEx and keyword search is optimized for structured and semi-structured documents, whereas machine learning models handle unstructured documents with greater contextual understanding.

In another embodiment, a generative pre-trained artificial intelligence with autosuggestions enhances extraction of the plurality of metadata attributes corresponding to the plurality of metadata fields by leveraging advanced natural language processing techniques.

In another embodiment, the metadata extraction module uses advanced Named Entity Recognition (NER) for accurately identifying key entities within the one or more batches of documents. NER may be used for analyzing unstructured documents such as emails, reports, and the like.

At 325, the method 300 includes classifying, by a first level verification module, each document as a parent document or a child document based on the plurality of metadata attributes extracted. The artificial intelligence model detects subtle variations in language and context, enabling the first level verification module to accurately determine the parent document and the child document.

It must be noted that the artificial intelligence model is configured with an artificial intelligence algorithm. Examples of the artificial intelligence algorithm include, but are not limited to, a Deep Neural Network (DNN), Convolutional Neural Network (CNN), Restricted Boltzmann Machine (RBM), Deep Belief Network (DBN) and Deep Q-Networks.

It must be noted that, in the first level verification module, the system focuses only on common metadata attributes when classifying the parent document and the child document. The common metadata attributes are the plurality of metadata fields that apply uniformly to both parent documents and child documents.

At 330, the method 300 includes enabling, by a reviewer module, one or more specialists to review, and confirm the classification of each document as the parent document and the child document manually. The reviewer module displays the classification results in a standardized format to the one or more specialist, highlighting the plurality of metadata fields and their corresponding attributes. The key details such as document type are clearly displayed, enabling the one more specialist to quickly and accurately determine whether a document is classified as a parent or child. Since the specialists have expertise in the respective domain of the documents, they may validate and refine the assigned classification as needed. This manual review process helps reduce potential errors from relying solely on artificial intelligence and enhances overall classification accuracy.

It must be noted that, any manual corrections made by the one or more specialists are fed back into the artificial intelligence model. The artificial intelligence model is retrained using data from the reviewer module, allowing the artificial intelligence model to contribute to continuous learning and model enhancement over time.

At 335, the method 300 includes allowing, by a rule defining module, the user to define one or more user-defined match up rules to determine a parent-child relationship and a peer-to-peer relationship across the one or more batches of documents. The parent-child relationship determines which child document is associated with a specific parent document, while the peer-to-peer relationship identifies connections between documents at the same hierarchical level, such as links between child documents. The one or more user-defined match up rules defining criteria for determining these relationships based on the plurality of metadata attributes extracted from documents.

At 340, the method 300 includes automatically determining, by the second level verification module, the hierarchical relationship including the parent-child relationship and the peer-to-peer relationship across the one or more batches of documents by analyzing the plurality of metadata attributes, contextual information and document classification using the one or more user-defined match up rules and the artificial intelligence model.

By leveraging metadata analysis, the second level verification module evaluates the plurality of metadata attributes. Additionally, contextual information is processed using natural language processing techniques to detect relationships between documents. The artificial intelligence model further refines document classification, where the child documents are linked to their respective parent documents, and peer-to-peer relationships, where related documents at the same level are associated with one another.

It must be noted that, in the plurality of metadata field, the common metadata fields including the entity name, document title, document type, and effective date are used for classifying the parent document and the plurality of metadata field specific to the child document, such as the parent effective date and parent agreement type are used for determining the parent-child relationship and the peer-to-peer relationship. M ore specifically, the common attributes are used for classifying the parent document and the child document while the child specific attributes are used to determining the parent-child relationship and the peer-to-peer relationship.

At 345, the method 300 includes generating, by the second level verification module, a structured data including the plurality of attribute and the corresponding plurality of metadata fields, the parent-child relationship and the peer-to-peer relationship across the one or more batches of document. The structured data is reviewed, and confirmed, by the one or more specialist using the reviewer module.

It must be noted that the structured data may be exported in various formats, including but not limited to Excel sheets, CSV files, relational databases, XML, and the like.

In an embodiment, the second level verification module is configured to assign a unique identifier to the child document corresponding to the parent document, thereby confirming a match. Thereby the user can easily understand the parent-child relationship. The second level verification module further flag the child document for further review by the one or more specialists if no match is identified.

At 350, the method 300 includes providing, by a display module, the reviewed structured data to the user via a user interface. Examples of the types of user interface include but are not limited to graphical user interface, command line interface, menu-driven user interface, touch user interface, natural language user interface and the like.

The method 300 ends at step 350.

Various embodiments of the system 100 and method for determining hierarchical relationship in batches of documents provide several benefits. The data collection module 120 streamlines the processing of structured and unstructured documents in batches, while the metadata configuration module 125 enables user-defined metadata fields for better organization. The metadata extraction module 130 ensures precise attribute extraction using artificial intelligence and advanced techniques, improving metadata accuracy. The first-level verification module 135 automates the classification of documents as parent or child, reducing human intervention and increasing efficiency. Additionally, the reviewer module 140 allows specialists to manually validate classifications, thereby reducing the reliance on artificial intelligence alone. The rule-defining module 145 further enhances accuracy by enabling users to define match-up rules for determining parent-child and peer-to-peer relationships. The second-level verification module 150 automates relationship validation by analyzing metadata, contextual information, and predefined rules, ensuring precise classification and hierarchy determination. Finally, the display module 155 provides users with a structured and reviewed document hierarchy through the user interface, improving accessibility and usability The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. A lso, those acts that are not dependent on other acts may be performed in parallel with the other acts. The scope of embodiments is by no means limited by these specific examples.

I claim:

1. A system for determining hierarchical relationship in batches of documents, comprising:
   a hardware processor; and
   a memory coupled to the hardware processor, wherein the memory comprises a set of program instructions in the form of a processing subsystem, configured to be executed by the hardware processor, wherein the processing subsystem is hosted on a server and configured to execute on a network to control bidirectional communications among a plurality of modules comprising:
   a data collection module configured to receive one or more batches of documents from a user, wherein each document of the one or more batches of documents is one of an unstructured document or a structured document;
   a metadata configuration module operatively coupled to the data collection module, wherein the metadata configuration module is configured to define a plurality of metadata fields to enable a structured metadata extraction from the one or more batches of documents, wherein the plurality of metadata fields is user-configurable and defined based on a user input;
   a metadata extraction module operatively coupled to the metadata configuration module, wherein the metadata extraction module is configured to:
      parse the one or more batches of documents to identify a plurality of metadata attributes corresponding to the plurality of metadata fields; and
      extract the identified plurality of metadata attributes using at least one of an artificial intelligence model and one or more extraction techniques;
   a first level verification module operatively coupled to the metadata extraction module, wherein the first level verification module is configured to classify each document as a parent document or a child document based on the plurality of metadata attributes extracted;
   a reviewer module operatively coupled to the first level verification module, wherein the reviewer module is configured to enable one or more specialists to review, and confirm the classification of each document as the parent document and the child document manually;
   a rule defining module operatively coupled to the reviewer module, wherein the rule defining module is configured to allow the user to define one or more user-defined match up rules to determine a parent-child relationship and a peer-to-peer relationship across the one or more batches of documents;
   a second level verification module operatively coupled to the rule defining module, wherein the second level verification module is configured to:
      automatically determine the hierarchical relationship comprising the parent-child relationship and the peer-to-peer relationship across the one or more batches of documents by analyzing the plurality of metadata attributes, contextual information and document classification using the one or more user-defined match up rules and the artificial intelligence model; and
      generate a structured data comprising the plurality of attribute and the corresponding plurality of metadata fields, the parent-child relationship and the peer-to-peer relationship across the one or more batches of document, wherein the structured data is reviewed, and confirmed, by the one or more specialist using the reviewer module; and
   a display module operatively coupled to the second level verification module, wherein the display module is configured to provide the reviewed structured data to the user via a user interface.

2. The system of claim 1, comprising an optical character recognition module configured to convert image-based the one or more batches of documents into one or more text-searchable formats.

3. The system of claim 1, wherein the one or more batches of documents comprises at least one of legal documents, financial documents, health care documents, and business-related documents.

4. The system of claim 1, wherein the plurality of metadata fields comprises at least one of entity name, document title, document type, effective date, parent effective date, and parent agreement type.

5. The system of claim 1, wherein the entity name, document title, document type, and effective date are used for determining a parent-child relationship, and the parent effective date and parent agreement type are used for determining a peer-to-peer relationship.

6. The system of claim 1, wherein the artificial intelligence model and the one or more extraction techniques collectively utilize natural language processing, machine learning, and rule-based algorithms to extract and classify the plurality of metadata fields.

7. The system of claim 1, wherein the second level verification module is configured to:
   assign a unique identifier to the child document corresponding to the parent document, thereby confirming a match; and
   flag the child document for further review by the one or more specialists if no match is identified.

8. The system of claim 1, comprising a database configured to store the structured data with the parent-child relationship and the peer-to-peer relationship.

9. The system of claim 1, wherein the second level verification module is configured to enable the one or more specialists to review and execute modification for an incorrect parent-child relationship and an incorrect peer-to-peer relationship, thereby update the structured data.

10. The system of claim 1, wherein the artificial intelligence model is continually retrained using manual corrections captured by the reviewer module, wherein the reviewer module captures modification and update training dataset of the artificial intelligence model.

11. A method for determining hierarchical relationship in batches of documents, comprising:
   receiving, by a data collection module, one or more batches of documents from a user, wherein each document of the one or more batches of documents is one of an unstructured document or a structured document;
   defining, by a metadata configuration module, a plurality of metadata fields to enable a structured metadata extraction from the one or more batches of documents, wherein the plurality of metadata fields is user-configurable and defined based on user input;
   parsing, by a metadata extraction module, the one or more batches of documents to identify a plurality of metadata attributes corresponding to the plurality of metadata fields;
   extracting, by the metadata extraction module, the identified plurality of metadata attributes using at least one of an artificial intelligence model and one or more extraction techniques;

classifying, by a first level verification module, each document as a parent document or a child document based on the plurality of metadata attributes extracted;

enabling, by a reviewer module, one or more specialists to review, and confirm the classification of each document as the parent document and the child document manually;

allowing, by a rule defining module, the user to define one or more user-defined match up rules to determine a parent-child relationship and a peer-to-peer relationship across the one or more batches of documents;

automatically determining, by the second level verification module, the hierarchical relationship comprising the parent-child relationship and the peer-to-peer relationship across the one or more batches of documents by analyzing the plurality of metadata attributes, contextual information and document classification using the one or more user-defined match up rules and the artificial intelligence model;

generating, by a second level verification module, a structured data comprising the plurality of attribute and the corresponding plurality of metadata fields, the parent-child relationship and the peer-to-peer relationship across the one or more batches of document, wherein the structured data is reviewed, and confirmed, by the one or more specialist using the reviewer module; and providing, by a display module, the reviewed structured data to the user via a user interface.

12. A non-transitory computer-readable medium storing a computer program that, when executed by a processor, causes the processor to perform a method for determining hierarchical relationship in batches of documents, wherein the method comprises:

receiving, by a data collection module, one or more batches of documents from a user, wherein each document of the one or more batches of documents is one of an unstructured document or a structured document;

defining, by a metadata configuration module, a plurality of metadata fields to enable a structured metadata extraction from the one or more batches of documents, wherein the plurality of metadata fields is user-configurable and defined based on user input;

parsing, by a metadata extraction module, the one or more batches of documents to identify a plurality of metadata attributes corresponding to the plurality of metadata fields;

extracting, by the metadata extraction module, the identified plurality of metadata attributes using at least one of an artificial intelligence model and one or more extraction techniques;

classifying, by a first level verification module, each document as a parent document or a child document based on the plurality of metadata attributes extracted;

enabling, by a reviewer module, one or more specialists to review, and confirm the classification of each document as the parent document and the child document manually;

allowing, by a rule defining module, the user to define one or more user-defined match up rules to determine a parent-child relationship and a peer-to-peer relationship across the one or more batches of documents;

automatically determining, by the second level verification module, the hierarchical relationship comprising the parent-child relationship and the peer-to-peer relationship across the one or more batches of documents by analyzing the plurality of metadata attributes, contextual information and document classification using the one or more user-defined match up rules and the artificial intelligence model;

generating, by a second level verification module, a structured data comprising the plurality of attribute and the corresponding plurality of metadata fields, the parent-child relationship and the peer-to-peer relationship across the one or more batches of document, wherein the structured data is reviewed, and confirmed, by the one or more specialist using the reviewer module; and providing, by a display module, the reviewed structured data to the user via a user interface.

* * * * *